US010229421B2

(12) United States Patent
Baszucki et al.

(10) Patent No.: US 10,229,421 B2
(45) Date of Patent: Mar. 12, 2019

(54) PROVIDING SPONSORED CONTENT IN VIRTUAL ENVIRONMENTS

(75) Inventors: David B. Baszucki, Portola Valley, CA (US); John Shedletsky, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 892 days.

(21) Appl. No.: 12/368,253

(22) Filed: Feb. 9, 2009

(65) Prior Publication Data

US 2010/0205035 A1   Aug. 12, 2010

(51) Int. Cl.
*G06Q 30/02* (2012.01)
*G06Q 20/10* (2012.01)
*G06Q 30/04* (2012.01)
*G06Q 40/04* (2012.01)

(52) U.S. Cl.
CPC .......... *G06Q 30/02* (2013.01); *G06Q 20/102* (2013.01); *G06Q 30/0209* (2013.01); *G06Q 30/0246* (2013.01); *G06Q 30/0277* (2013.01); *G06Q 30/04* (2013.01); *G06Q 40/04* (2013.01)

(58) Field of Classification Search
CPC ............... G06Q 30/00; G06Q 30/0207; G06Q 30/0209; G06Q 30/0245

USPC ... 705/7, 14, 14.12, 14.41, 14.73, 14.45, 37, 705/14.68, 14.61; 715/854, 757; 463/31
See application file for complete search history.

(56) References Cited

U.S. PATENT DOCUMENTS

| | | | |
|---|---|---|---|
| 7,101,284 B2 * | 9/2006 | Kake et al. ...................... 463/31 |
| 7,712,052 B2 * | 5/2010 | Szeliski et al. ............... 715/854 |
| 7,895,076 B2 * | 2/2011 | Kutaragi ................. A63F 13/77 705/14.4 |
| 2007/0061204 A1* | 3/2007 | Ellis ....................... G06Q 30/02 705/14.61 |
| 2008/0071594 A1* | 3/2008 | Morin ............................... 705/7 |
| 2008/0262910 A1* | 10/2008 | Altberg et al. .................. 705/14 |
| 2009/0063283 A1* | 3/2009 | Kusumoto et al. ............. 705/14 |
| 2009/0157495 A1* | 6/2009 | Cahuzac et al. ................ 705/14 |
| 2010/0100429 A1* | 4/2010 | McCloskey ............ G06Q 30/02 705/14.12 |

\* cited by examiner

*Primary Examiner* — Marilyn G Macasiano
(74) *Attorney, Agent, or Firm* — Lowenstein Sandler LLP

(57) ABSTRACT

The present invention pertains to a method and apparatus for providing advertisements in virtual world environments. In one embodiment, the method may include providing at least one advertisement to be displayed within a virtual world environment distributed to a plurality of user computer systems. The method may also include determining that a user is interacting with the advertisement in the virtual world environment. In one embodiment, the method may further include tracking one or more factors associated with the interaction.

26 Claims, 11 Drawing Sheets

US 10,229,421 B2

PROVIDING SPONSORED CONTENT IN VIRTUAL ENVIRONMENTS

FIELD OF THE INVENTION

This invention relates to the field of computer-aided modeling of virtual reality and, in particular, to the providing advertisements in virtual world environments.

BACKGROUND

Online advertising has become ubiquitous. In conventional online advertising, advertisements are distributed via the Internet and World Wide Web. Examples of online advertising include advertisements that accompany web page search results, banner advertisements on web pages, online classified websites, email marketing, and spam.

Building and playing with models online is becoming increasingly popular among various users. Internet-based virtual worlds are simulated, enabling users to travel within a virtual world, play games within the virtual world, and interact with other inhabitants (i.e., other users) of the virtual world. Some virtual world environments include advertisements for real world companies, as well as virtual companies.

One example of advertising in a virtual environment is found in the video game GRAND THEFT AUTO™. Users in the game drive around a virtual city and may use a virtual radio to hear songs during a game. The songs are advertisements to prompt game players to buy the songs. Furthermore, as users navigate through the game, billboards are displayed which include advertisements (similar to traditional physical billboards). However, both the songs played on the virtual radio and billboards displayed in the gaming environment, are simply hardcoded into the game in advance of runtime.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
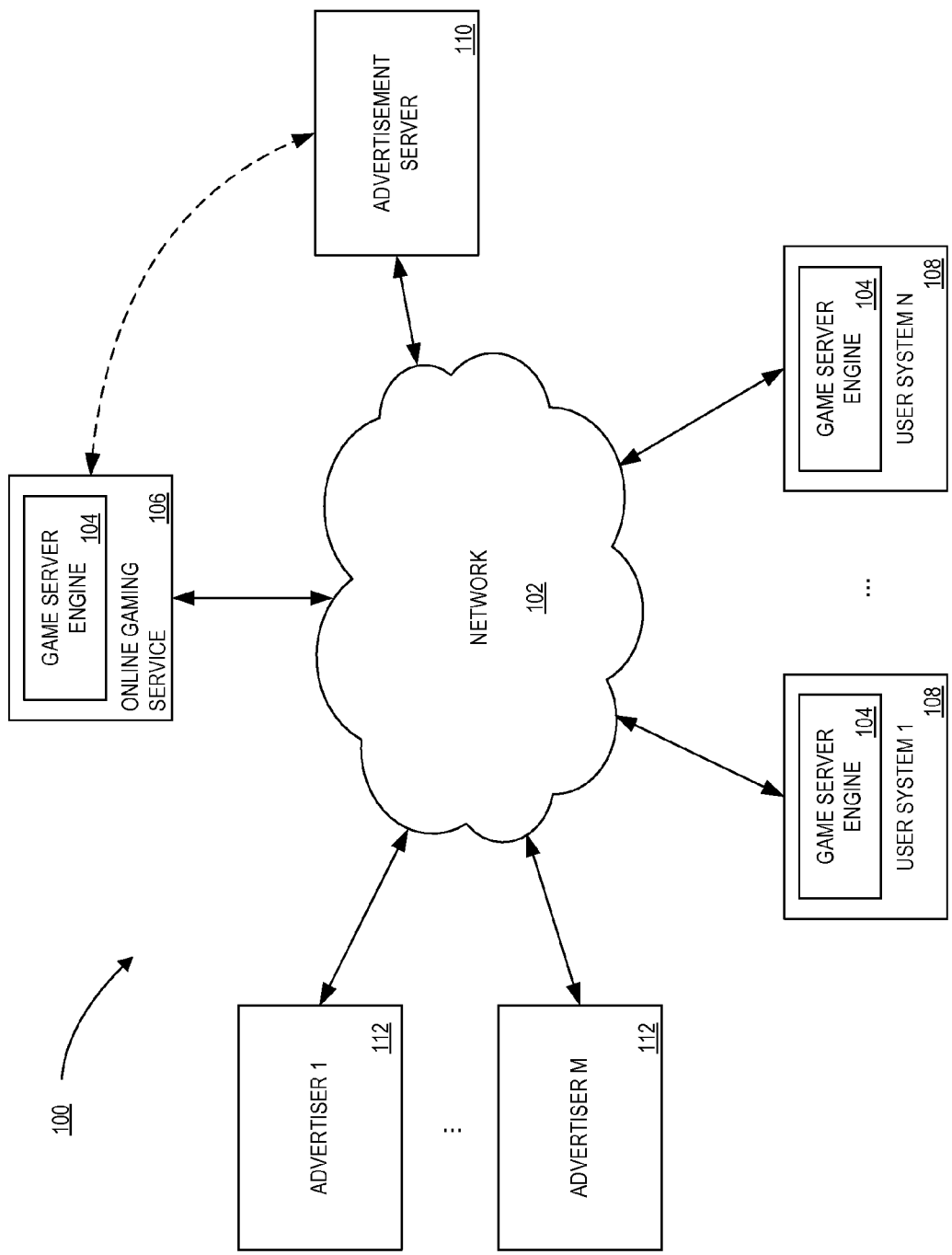
FIG. 1A illustrates one embodiment of network architecture in which embodiments of the present invention may operate.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), etc.

The present invention may also be practiced in distributed computing environments where the machine readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A method and apparatus for providing advertisements in virtual world environments is described. In one embodiment, at least one advertisement is provided for display within a virtual world environment distributed to a plurality of user computer systems. In one embodiment, the virtual world environment is a three-dimensional online multi-player gaming environment.

In one embodiment, a determination is made that a user is interacting with the advertisement in the virtual world environment, and one or more factors associated with the interaction are tracked. Because advertisement content for display in virtual environment may take many forms, such as, for example, images, sound clips, video clips, advertisements placed on three-dimensional models, etc., tracked interactions may include a user hearing an advertisement, selecting an advertisement, clicking an advertisement, viewing an advertisement, or a combination of interactions. Furthermore, additional factors such as a user's perspective relative to an advertisement over a period of time may also be tracked.

In one embodiment, the results of tracking may be accumulated to enable an accounting for the interactions. Accounting may include debiting or charging advertisers when associated advertisement content is placed and/or users interact with the advertisement content in a virtual world environment. Furthermore, for users that include advertisement content in user-created content (e.g., user-created models, clothing, virtual places, etc.), accounting may include crediting users with virtual or actual currency for successful advertisement placement in the virtual world environment.

FIG. 1A illustrates one embodiment of network architecture 100 in which embodiments of the present invention may operate. The architecture 100 includes online gaming service 106 coupled to a communications network 102 such as a public network (e.g., the Internet, a wireless network, etc.) or a private network (e.g., LAN, Intranet, etc.). The online gaming service 106 communicates with multiple user systems, such as user system (user system 1 through user system N) 108 via the network 102. The online gaming service 106 further communicates with an advertisement server 110 via the network 102.

Each user system 108 hosts a game server engine 104. The game server engine 104 is responsible for allowing a user to build models, play games, and navigate throughout virtual environments that are physically realistic in a 3D virtual world. Models are constructed from parts, or 3D virtual objects, that automatically join together to aid the user in editing. A part may be a primitive geometrical shape such as a block, a cylinder, a sphere, etc., or some other primitive shape such as a wedge, a torus, a tube, a channel, etc. Games are created by placing models in the 3D world. Games incorporate gameplay logic that triggers game events. The game server engine 104 may publish a user's model or game by transferring the model or the game to an online gaming service 106. Furthermore, in one embodiment, the game server engine 104 enables users of user systems 108 to place advertisements in user created content, such as user created games, user created virtual places, user created themed places, etc. In one embodiment, game server engine 104 further reports advertisement placement, or viewing, by a user system 108 to advertisement server 110.

The online gaming service 106 is responsible for storing models and games created by users of the user systems 108. A user may be, for example, a young child (e.g., 6-10 years old), an older child, a teenager, or an adult. In one embodiment, an online gaming service 106 maintains a game catalog and a model catalog that may be presented to users in a window of a browser application running on a corresponding user system 108 or a window controlled by the game server engine 104. A user may select a game (created by this or other user) from the game catalog to play. The game catalog includes images of games stored on an online gaming service 106. In addition, a user may select a model (created by this or other user) from the model catalog to modify and/or add to a new game. The model catalog includes images of models stored on an online gaming service 106. In one embodiment, an online gaming service 106 conducts contests for model building, game building, or high scores in individual games. Online gaming service 106 further hosts a game server engine 104.

In one embodiment, online gaming service 106 hosts one or more virtual places, and provides those virtual places to user systems 108 via network 102. A virtual place may be, for example, a town, city, state, home, building, park, coffee shop, game site, flat platform, any region on a virtual plane, etc. Each virtual place has a geography and relationships to other virtual places, thereby creating a virtual world, virtual country, virtual town, etc. In one embodiment, the virtual places are connected places (e.g., virtual places are connected with other virtual places) via proximity of places in the virtual world environment, user-defined connection, teleportation connections, etc. Furthermore, users of user systems 108 may gather in, travel through, and interact with other users within the virtual places.

In one embodiment, online gaming service 106 supplies advertisement content to user systems 108, to enable the user systems to place the advertisements in user-created games, virtual places, and other user-created content (e.g., user-created clothing, models, etc.). The advertisement content may be digital images, sound clips, video clips, 3D models, etc. for advertisers, such as advertisers (advertiser 1 through advertiser M) 112. Online gaming service then supplies the advertisements, in the user created content, to user computer systems 108 in a virtual world environment, game, etc.

The advertisement server 110 is responsible for managing advertisement content. As discussed in greater detail below, advertisement server 110 receives advertisement content (e.g., video, images, 3D models, sound clips, etc.) from advertisers 112. In one embodiment, bid data is received along with advertisement content, which specifies how much an advertiser is willing to pay for placement and viewing of a particular advertisement in a 3D virtual environment. Advertisement server 110 receives reports from user systems 108 when advertisements are viewed, clicked, or otherwise interacted with in a virtual environment. The received reports are accumulated and analyzed by advertisement server 110 to bill advertisers 112 when bids for advertisements are satisfied.

In one embodiment, advertisement server 110 further transmits data to online gaming service 106 to inform online gaming service 106 that an advertisement bid, associated with user created content, has been satisfied. In response to receiving the data, online gaming service 106 may reward a user who placed the advertisement content in a virtual world, by crediting a corresponding user system 108 with virtual currency for use in a virtual world, actual currency, or a combination of both. In another embodiment, advertisement server 110 credits user systems 108 directly when an advertisement bid has been satisfied.

In one embodiment, advertisement server 110 is a remote server independently operated and controlled from online gaming service 106. In another embodiment, as indicated by the dashed line, advertisement server 110 is locally coupled with, or integrated into, online gaming service 106.

Figure 1B:
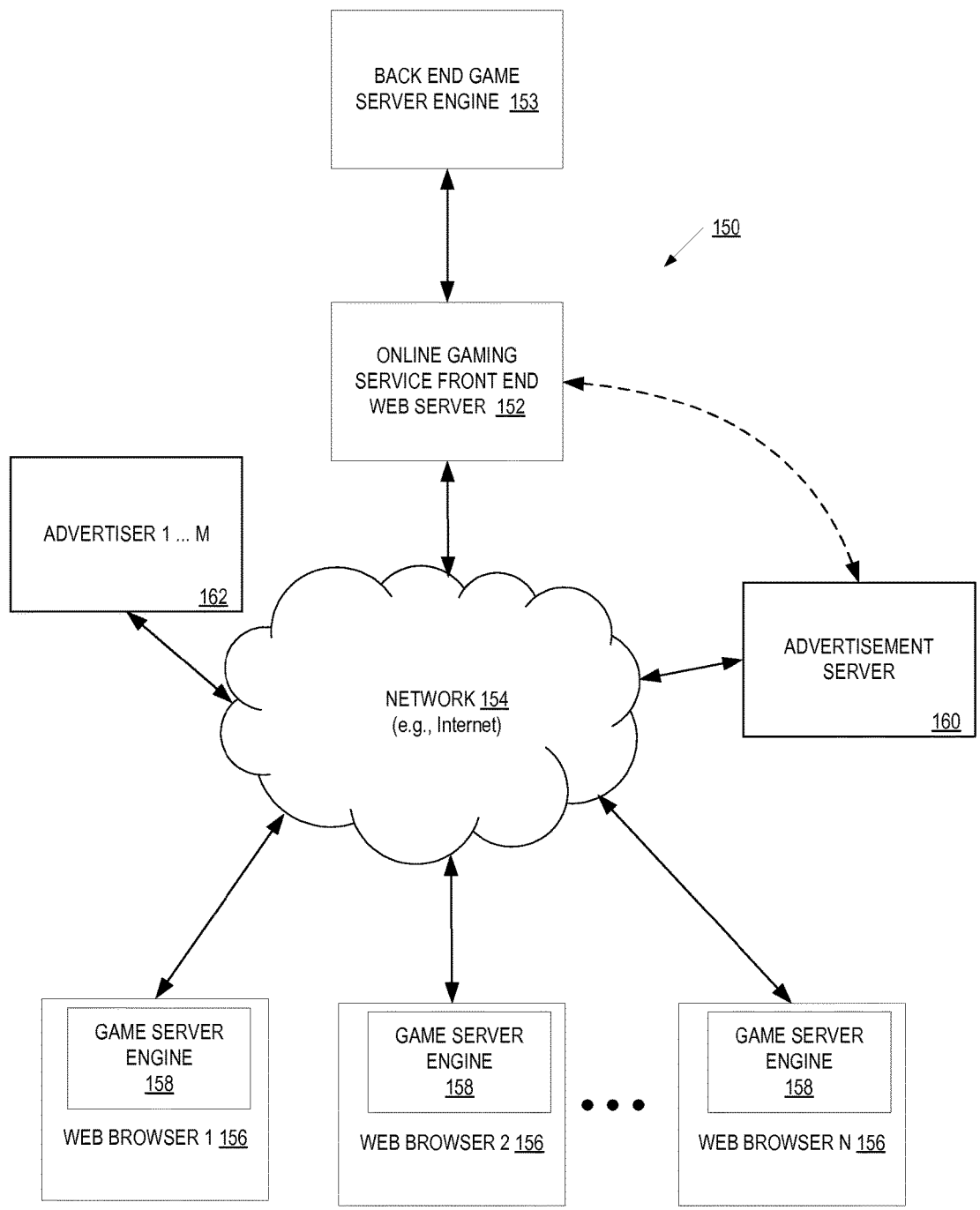
FIG. 1B illustrates one embodiment of network architecture in which embodiments of the present invention may operate.

FIG. 1B illustrates one embodiment of network architecture 150 in which embodiments of the present invention may operate. The architecture 150 includes an online gaming service front end web server 152 coupled to a communications network 154 such as a public network (e.g., the Internet, a wireless network, etc.) or a private network (e.g., LAN, Intranet, etc.), and coupled to a back end game server engine 153. The online gaming service front end server 152 communicates with multiple user systems, such as web browsers (browser 1 through browser N) 156 via the network 154.

Front end web server 152 communicates with back end game server engine 153 so that back end game server engine 152 can enable web browsers 156 to build models, play games, and navigate throughout virtual environments that are physically realistic in a 3D virtual world.

Each web browser 156 can provide local processing through JAVASCRIPT™ or a plug-in application such as JAVA™, FLASH™, SHOCKWAVE™, SILVERLIGHT™, ACTIVE-X™, etc. application. Furthermore, game server engine 158 is provided to web browser applications from back end game server engine 153. Thus a game server engine 158 running in web browsers 156, can communicate with back end game server engine 153 over network 154 to enable a user of a web browser 156 to build models, play games, and navigate throughout virtual environments that are physically realistic in a 3D virtual world on a web browser. The online gaming service front end server 152 is responsible for storing models and games created by users of the web browsers 156.

The advertisement server 160 is responsible for managing advertisement content. As discussed in greater detail below, advertisement server 160 receives advertisement content (e.g., video, images, 3D models, sound clips, etc.) from advertisers 162. In one embodiment, bid data is received along with advertisement content, which specifies how much an advertiser is willing to pay for placement and viewing of a particular advertisement in a 3D virtual environment. Advertisement server 160 receives reports from web browsers 156 when advertisements are viewed, clicked, or otherwise interacted with in a virtual environment.

Figure 2:
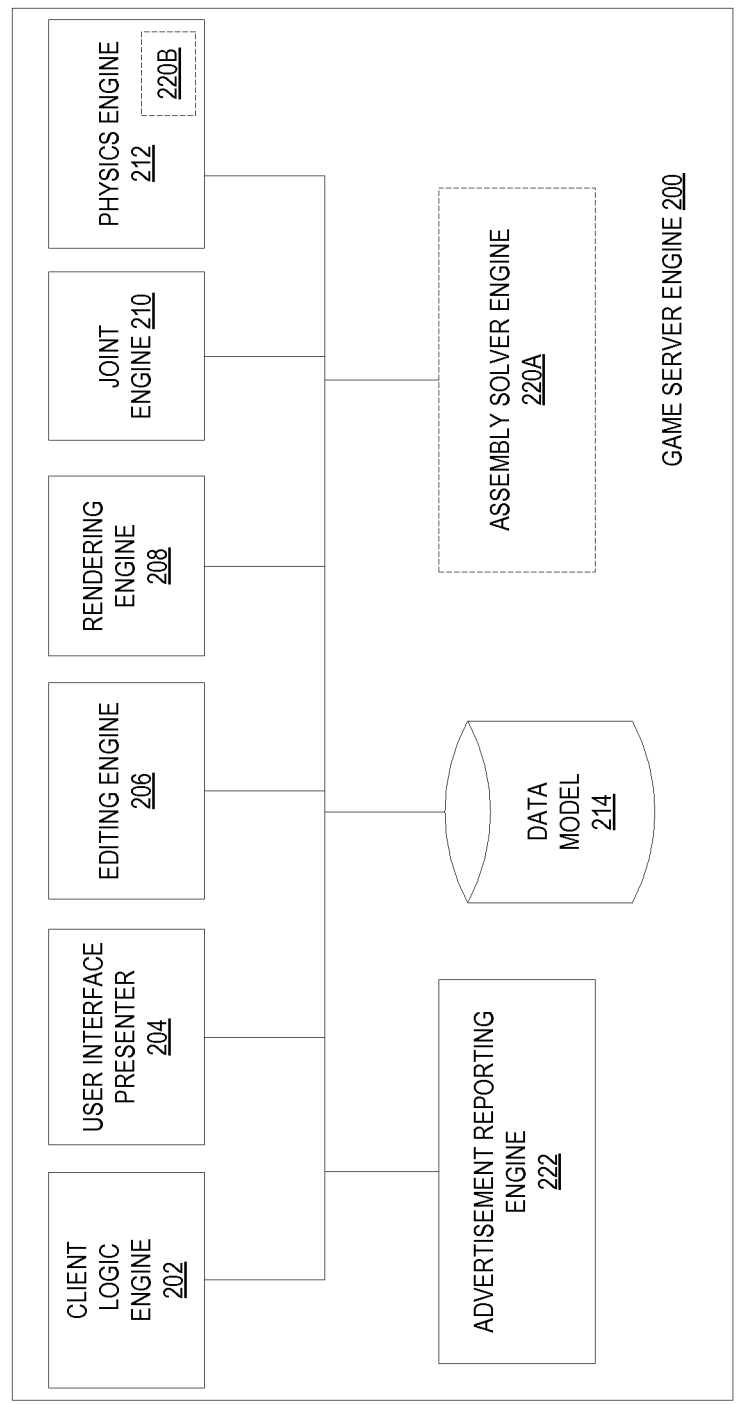
FIG. 2 is a block diagram of one embodiment of a game server engine.

FIG. 2 is a block diagram of one embodiment of a game server engine 200 (e.g., game server engine 104 of FIG. 1). The game server engine 200 may include a game logic engine 202, a user interface presenter 204, an editing engine 206, a rendering engine 208, a joint engine 210, physics engine 212, a data model 214, an assembly solver engine 220A, and an advertisement reporting engine 222. In one embodiment, assembly solver engine 220A may be a stand-alone engine of game server engine 200, or included in physics simulation engine 212, as illustrated by box 220B.

The game logic engine 202 is responsible for invoking components of the game server engine 200 based on user requests, and exchanging data with the online gaming service 106 or 156 based on user requests.

The user interface presenter 204 is responsible for generating user interfaces (UIs), presenting UIs to a user and receiving input provided by the user via the UIs. In one embodiment, UIs are presented in a window(s) of a browser application (i.e., a FLASH™, JAVA™ plug-in, SHOCKWAVE™, SILVERLIGHT™, etc. browser application) running on a user system. Alternatively, UIs may be presented in a window(s) controlled by the game server engine 200. The UIs provided by the user interface presenter 204 may include, for example, a home page UI, a build UI, a game catalog UI, a model catalog UI, etc. The home page UI may present to a user a list of available options (e.g., to build a new model or game, to access an existing model or game, etc.). The build UI may allow a user to select desired parts and/or models, create clothing, etc. and may display the selected parts and/or models in a 3D virtual world.

The editing engine 206 is responsible for editing new and existing games and models based on user input, defining properties of new and existing models and games, and creating and updating a data model 214 for each new and existing model and game. In one embodiment, the editing engine 206 is further responsible for enabling users to place transportation portals, hyperlinks, bounded areas, etc. within virtual worlds. A data model 214 is a collection of data describing a game or a model that is structured using a specific format (e.g., XML schema, binary or proprietary format). In one embodiment, the editing engine 206 may further enable a user to place advertisements in user-created models, clothing, games, etc., as well as user created virtual places.

The joint engine 210 is responsible for joining parts based on their proximity to each other in the 3D world as will be discussed in more detail below.

The rendering engine 208 is responsible for interpreting and displaying 3D images of models and games within the 3D view.

The physics engine 212 is responsible for simulating the motion of objects (models and/or parts) displayed in the 3D view. In one embodiment, the physics engine 212 simulates the object motion by computing object position and orientation on a frame by frame basis. In one embodiment, physics engine 212 computes object position and orientation periodically (e.g., 30 times per second).

The assembly solver engine 220A or 220B, is responsible for receiving a plurality of 3D objects and determining two or more 3D objects that do not move positions relative to each other during a frame of motion simulation. In one embodiment, the assembly solver engine 220A or 220B creates one or more super bodies that are provided to physics engine 212 on a frame by frame basis, instead of providing individual 3D virtual objects that make up the super bodies and the rigid joints between the 3D virtual objects. However, 3D objects that are not determined to be part of a super body are provided to the physics simulation engine 212 individually, as well as joints between the 3D objects and super bodies.

The advertisement reporting engine 222 is responsible for monitoring a 3D virtual game or environment for advertisement content, and reporting user interactions with advertisement content to an advertisement server, such as advertisement server 110 of FIG. 1. User interactions with visual advertisements may include viewing an advertisement, clicking an advertisement, a length of time the advertisement was viewed, a "pixel time" the advertisement was viewed, a length of time a user stays within a sponsored virtual place, etc. In one embodiment pixel time may include one or more of screen space of a user system occupied by advertisement content over a length of time, a distance at which the advertisement was viewed, an angle relative to the normal angle for an advertisement, etc. User interactions with audio advertisements may include a determination of whether an advertisement was played by a user system, whether ambient noise impacts playing an advertisement, whether the entire advertisement was played, etc.

Figure 3:
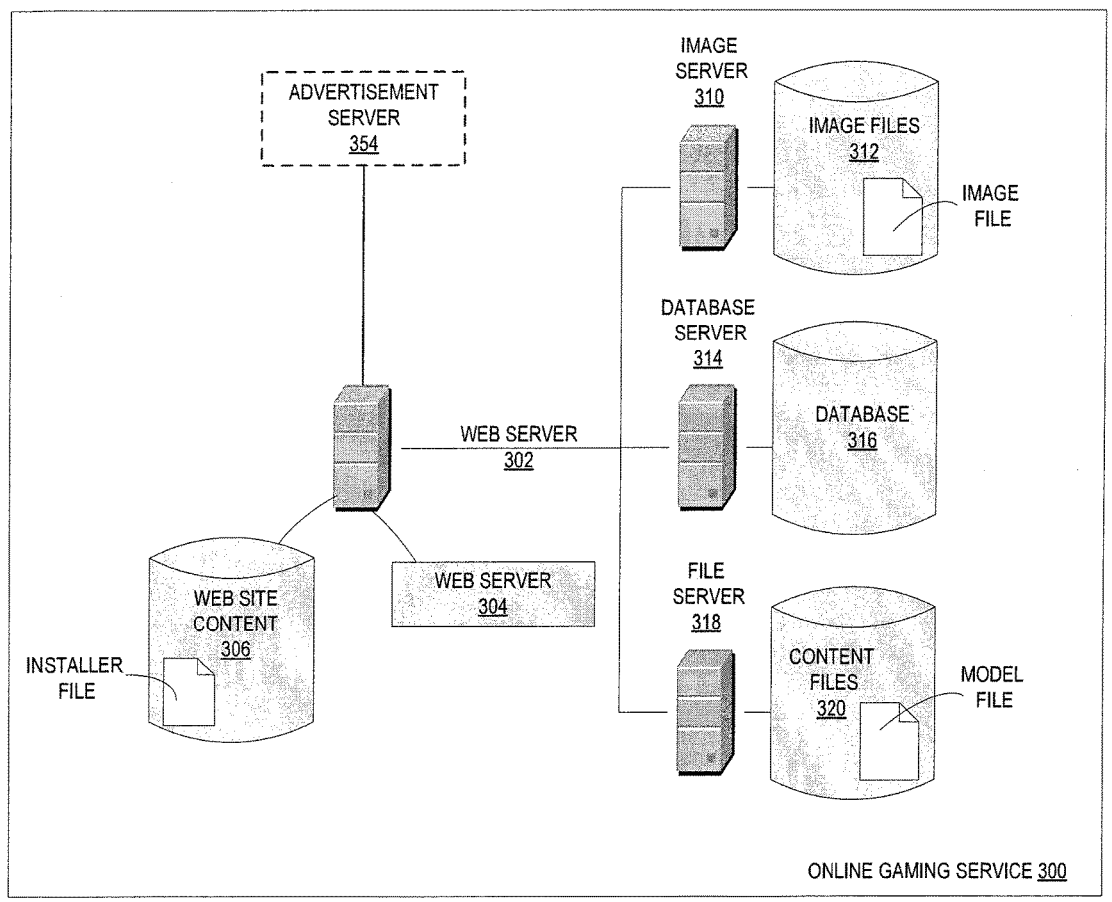
FIG. 3 illustrates one embodiment of the architecture of an online gaming service.

FIG. 3 illustrates one embodiment of the architecture of an online gaming service 300. The online gaming service 300 includes a web server 302, an image server 310, a database server 314 and a file server 318. In one embodiment, online gaming service 300 includes an advertisement server 354. However, as indicated by dashed line, advertisement server 354 may also be remote to online gaming service 300.

The file server 318 stores content files 320 received from user systems 108 or 158. The content files 320 include files of models and games created by the users of user systems 108 or 158. These files may be, for example, in extensible markup language (XML) format, binary format, etc. The content files 320 may also include various large media files such as textures, skyboxes, sounds, etc. The content files 320 may also include advertisements placed in content by users.

The image server 310 stores images files 312 that include images of models and games stored on the file server 318.

The database server 314 hosts a database 316 that stores, for example, profile information of each user, account information of each user, game and model information, virtual bank account information, news information, information pertaining to online forums maintained by the online gaming service 300, etc. The profile information of each user may specify, for example, games created by a user, models created by a user, public information about a user (e.g., "About Me"), recently played games, favorite games, user scores and ratings, etc. The account information may include, for example, user ID and password. The game and model information may include, for example, indexes of game and model files, indexes of corresponding game and model images, game creators, game creation dates, game popularity, user rankings of games, etc. The virtual bank account information may store virtual currency accumulated by a user (e.g., virtual currency credited to the bank account for advertisements in user-created content, virtual currency debited from the bank account for purchases in the virtual world, etc.) The news information may include, for example, general information about games, information about current contests (e.g., rewards offered for users who achieve high scores for a game, etc.), etc. The forum information may include, for example, discussions about games and models, technical support forum information, etc. In one embodiment, database 316 further stores "friends" of particular user in the profile information, thereby enabling users to specify their social groups.

The web server 302 hosts web site content 306 and web server logic 304. The web server logic 304 receives content requests from clients 106 and/or web pages (e.g., HTML pages) with the requested content to the user systems 108. In one embodiment, the web server logic 304 is responsible for composing model and game catalogs with images of models and games from the image server 310, and sending pages containing these catalogs to the user systems 108. The web site content 306 may include, for example, model and game catalogs, cached model and game files, an installer file for a game server engine 104 transmitted to a user system 108, etc.

The advertisement server 354, discussed in greater detail below, hosts an interface for receiving advertisement content and associated bids from advertisers 112, receives advertisement reports from user systems 108, and analyzes the reports for accounting purposes (e.g., to charge advertisers when bids are satisfied, and to cause user virtual bank accounts to be credited for successful advertisement placement).

Figure 4:
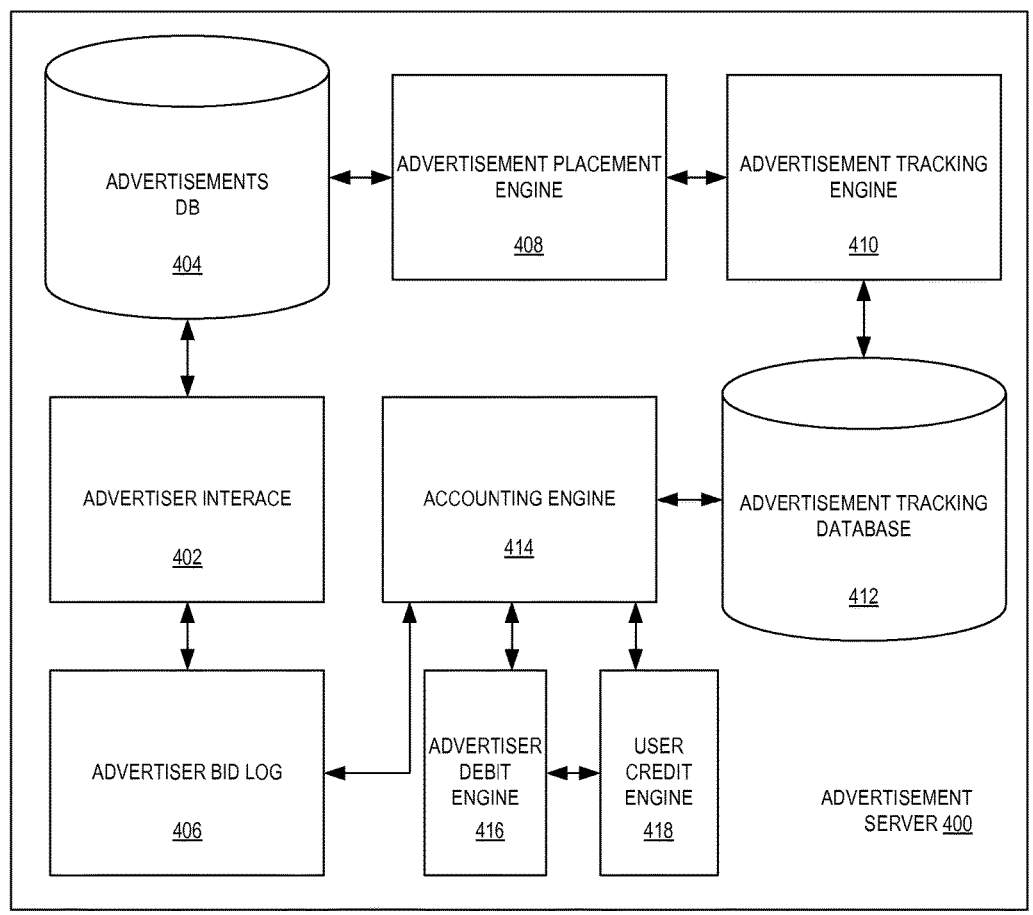
FIG. 4 is a block diagram of one embodiment of an advertisement server.

FIG. 4 is a block diagram of one embodiment of an advertisement server 400 (e.g., advertisement server 110 of FIG. 1). The advertisement server 400 may include an advertiser interface 402, advertisements database 404, advertiser bid log 406, advertisement placement engine 408, advertisement tracking engine 410, advertisement tracking database 412, accounting engine 414, advertiser debit engine 416, and user credit engine 418.

Advertiser interface 402 supplies an interface to enable advertisers, such as advertisers 112, to submit advertisements for placement in a 3D virtual world environment, virtual games, etc. In one embodiment, advertiser interface 402 is a web page front end for receiving advertisement content and associated bids via a network, such as network 102.

Received advertisement content, such as text advertisements, video advertisements, audio advertisements, and image advertisements, are stored in advertisements database 404. In one embodiment, database 404 maintains current ads and includes data for placing these ads in a 3D game or virtual environment (e.g., 3D models, sounds, textures, executable code, etc.). In one embodiment, the advertisements may be organized with rules about where the advertisement can be placed, a genre the advertisement is relevant to, appropriate user levels (e.g., age, gaming experience, etc.) etc.

Bid data associated with the received advertisement content is stored in advertiser bid log 406. Additional data, such as advertiser identification data, prepayments, advertisement preferences, etc. may also be received at advertiser interface 402, and stored along with advertisement content and bids.

Advertisement placement engine 408 supplies advertisement content from advertisement database 404 to an online gaming service 106. The advertisements may be supplied to user systems 108 via online gaming service 106 when users are creating content, to enable users to place advertisements in user-created content. In one embodiment, advertisement placement engine 408 supplies online gaming service 106 with a discovery and/or browsing mechanism that enables users to search for advertisement (e.g., search by theme, product name, appropriateness, etc.).

In one embodiment, when advertisements are inserted into user content, pointer data to the advertisement in advertisements database 404 is stored in the user content. In one embodiment, advertisement placement engine 408 may then utilize advertisement content pointers to supply advertisement content to user systems 108 at runtime for a 3D virtual world environment, virtual game, or an associated website.

In one embodiment, as discussed below, advertisement placement engine 408 may also dynamically select advertisements for placement in a 3D virtual world environment or virtual game. In one embodiment, dynamic selection of advertisement is based on a current gaming or website context.

Advertisement tracking engine 410 is responsible for receiving and accumulating advertisement reports. As discussed herein, when a user of user system 108 interacts with advertisement content, a game server engine 104 reports the interaction to advertisement tracking engine 410. Advertisement reports specify a type of interaction (e.g., click, view, audible, etc.), length of interaction, and quality of interaction (e.g., a "pixel time" for visual advertisements, ambient audio influence for audio advertisements, or a combination of both for video advertisements). Advertisement tracking engine 410 analyzes the data specified in the report and stores advertisement interaction results in advertisement tracking database 412. When advertisement results exist for a particular advertisement in advertisement tracking database 412, advertisement tracking engine 410 updates the database record to reflect the additional user interactions.

Accounting engine 414 is responsible for monitoring advertisement tracking results stored in advertisement tracking engine 412. The results are compared against corresponding advertiser bids stored in advertiser bid log 406 to determine when a bid for an advertisement has been satisfied. When accounting engine 414 determines that a bid for an advertisement has been satisfied, accounting engine 414 supplies data indicating the successful bid to both the advertiser debit engine 416 and user credit engine 418.

Advertiser debit engine 416 is responsible for charging advertisers when a bid associated with an advertisement has been satisfied. In one embodiment, advertiser debit engine 416 generates and transmits an invoice to the appropriate advertiser. In another embodiment, advertiser debit engine 416 debits a prepaid advertisement account associated with the advertiser.

User credit engine 418 is responsible for generating and transmitting a report to an online gaming service 106 that a bid has been satisfied. The report enables online gaming service 106 to credit a virtual bank account for the user responsible for placement of the advertisement in a virtual environment.

In one embodiment, advertisement server 400 receives advertisement content, places ads, and tracks user interactions as a meta-game within a 3D environment (e.g., a 3D virtual world or virtual game). Thus, placement of advertisements and tracking the results becomes a meta-game between users of a 3D virtual world and associated web environments. In another embodiment, advertisement server 400 receives commercial advertisement content. As a result of successful commercial advertisement placement by users, the commercial advertiser would be debited real currency, while a corresponding user is credited with virtual currency (e.g., currency for use within the virtual world environment, an associated website, etc.). In yet another embodiment, meta-game advertisements and commercial advertisements are tracked simultaneously by advertisement server 400.

Figure 5:
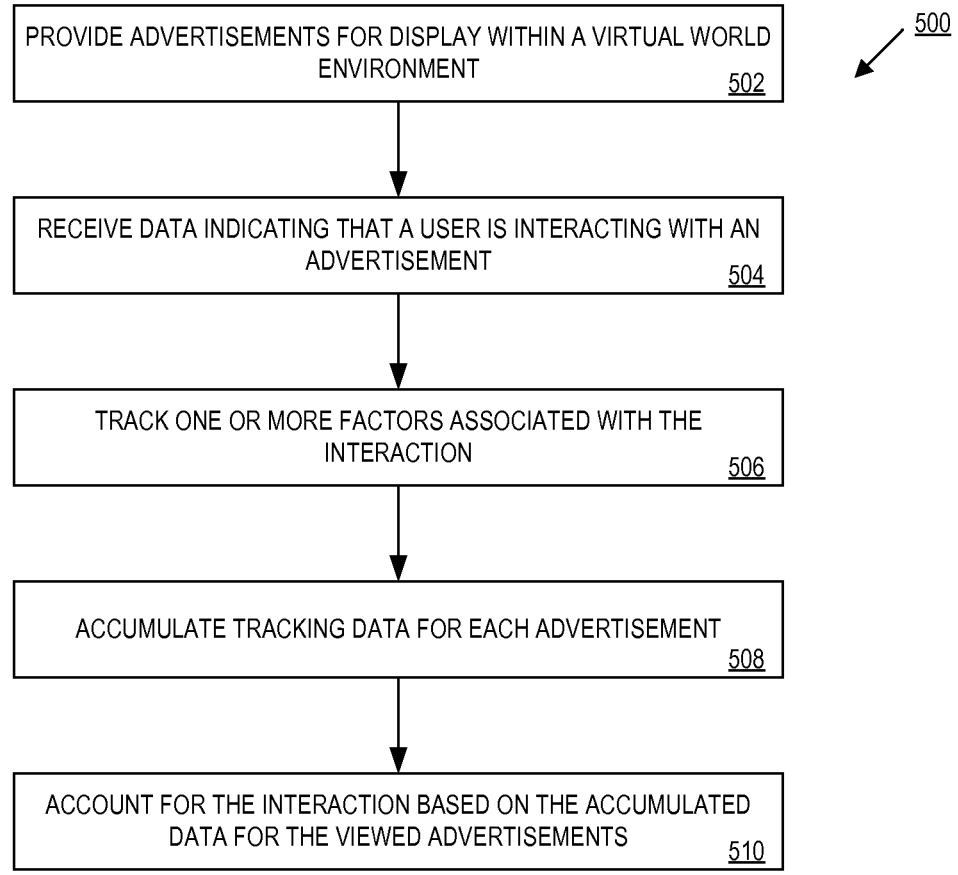
FIG. 5 is a flow diagram of one embodiment of a method for an advertisement system in a 3D virtual world environment.

FIG. 5 is a flow diagram of one embodiment of a process 500 for an advertisement system in a 3D virtual world environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in the advertisement server 400 of FIG. 4.

Referring to FIG. 5, process 500 begins with processing logic providing advertisements for display within a virtual world environment (processing block 502). In one embodiment, the advertisements are supplied by one or more advertisers, and may be in the form of text, audio, video, graphic images, 3D models, etc. As discussed herein, the advertisements are integrated into user-created content, such as user-created virtual places, clothing, models, and games, and deployed in the virtual world environment.

Because advertisements are provided within virtual world, gaming, and web environments, in one embodiment, the advertisements provided by processing logic may include window, door, immersive, impact, and contextually sensitive advertisements.

In one embodiment, a window advertisement provides a display and or sound from another virtual space. In one embodiment, window ads show live or recorded video of a virtual space. For example, there may be a sports bar within a virtual world environment that includes window advertisements, which display images of a racing event going on in a virtual game somewhere else in the virtual world environment.

In one embodiment, a door advertisement provides a link or door into virtual spaces. For example, selection of a banner advertisement at a website could transport a user's character into a specific 3d virtual space. As another example, an advertisement could take the form of a virtual teleportation pad that transports users to distinct 3d virtual spaces (e.g., users are teleported to Mars in an advertisement/teleportation pad sponsored by NASA).

In one embodiment, an immersive advertisement refers to a virtual place that includes a plurality of advertisements dedicated or tied to a specific advertiser, product, theme, etc. For example, COCA-COLA™ may sponsor a virtual amusement park, where COCA-COLA™ logos, trademarks, products, etc. are displayed throughout the virtual amusement park. As another example, AMERICAN AIRLINES™ may sponsor a virtual airport that enables users to ride in an AMERICAN AIRLINES™ plane to different destinations within a virtual world environment. As yet another example, a user might create a virtual baseball game, in which advertisements directed at baseball (e.g., sports manufacturers, professional baseball teams, trading card companies, etc.) are dynamically chosen for the game In one embodiment an impact advertisement is one that effects or causes special gameplay effects for users that have selected the advertisement or virtually use an advertised product. For example, STARBUCKS™ may advertise and sell virtual coffee within a virtual game or virtual world. As a result of a user drinking the virtual STARBUCKS™ coffee, the user's avatar might become 10% faster for a limited amount of time.

In one embodiment, contextually sensitive advertisements include advertisements dynamically selected based on criteria surrounding the advertisement. In one embodiment, the criteria may include user based factors, such as, historical data about where a user normally spends time within a virtual world environment, virtual games the user plays, etc. In one embodiment, the criteria may also include external or environmental factors, such as, time of year, external events, etc. The criteria may then be used to target users with specific ads. For example, if a new Batman movie is released, advertisements may be selectively targeted to specific virtual spaces (e.g., a superhero space), specific users (e.g., users who often play superhero based games), or a combination of both.

Processing logic receives data indicating that a user is interacting with an advertisement (processing block 504). In one embodiment, the data indicating user interaction with an advertisement may indicate that a user has clicked on an advertisement, selected the advertisement, viewed the advertisement, or otherwise interacted with the advertisement. Where the advertisement includes audio features, such as sound clips, videos, etc., the data may indicate that a user is hearing advertisement content.

Processing logic tracks one or more factors associated with the interaction (processing block 506). As noted above, users may interact with advertisement material in different ways in a 3D virtual environment, virtual game, or associated website. Thus, in one embodiment, processing logic tracks one or more factors for each add.

In one embodiment, discrete factors such as user clicks, selection, and playing video/audio advertisements are tracked (e.g., a user did, or did not, click on an advertisement). In one embodiment, processing logic also tracks factors unique to the 3D environment with respect to users interacting with advertisements. In one embodiment, processing logic tracks a "pixel time" associated with a user viewing an advertisement. Pixel time may include one or more of how much of a user rendering system is occupied by an advertisement, a length of time an advertisement is displayed, a distance between the user and advertisement in the virtual world environment, an angle relative to the normal angle the user views the advertisement at, etc. In one embodiment, processing logic also tracks audio advertisement components, such as how long audio clips are played, whether there was ambient noise obscuring the audio clip, etc.

Processing logic accumulates tracking data for each advertisement (processing block 508). In one embodiment, data regarding an advertisement is added to existing tracking data for the advertisement.

Processing logic accounts for the interactions based on the accumulated data for the advertisements (processing block 510). Because advertisements are submitted by advertisers along with bids (e.g., what type of user interactions advertisers are willing to pay for, and what triggers the payment), the accumulated tracking data is utilized by processing logic to ensure that advertiser bids are satisfied before crediting users or debiting advertisers.

Figure 6:
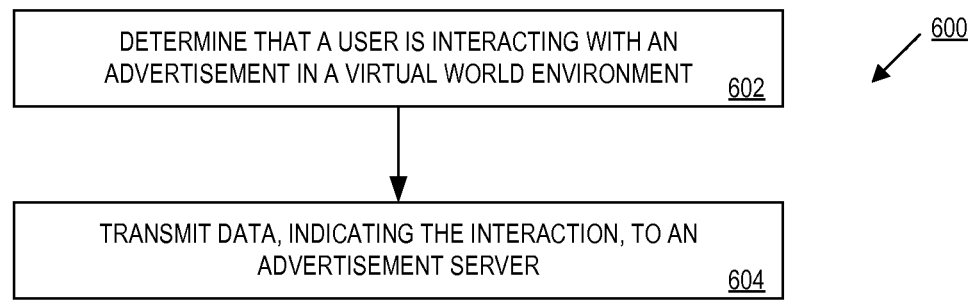
FIG. 6 is a flow diagram of one embodiment of a method for a game server engine supporting advertisements in a 3D virtual world environment.

FIG. 6 is a flow diagram of one embodiment of a process 600 for a game server engine supporting advertisements in a 3D virtual world environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in the game server engine 200 of FIG. 2.

Referring to FIG. 6, process 600 begins with processing logic determining that a user is interacting with an advertisement in a virtual world environment (processing block 602). Because processing logic renders a virtual world on a user system, processing logic has data about each element rendered, including data indicating whether an object is an advertisement. When processing logic detects that an element is an advertisement, processing logic is able to record whether a user clicks on that element, selects the element, how long the element is rendered, how the element is rendered relative to a user's perspective (e.g., distance, angle, etc.), whether part of the advertisement is obscured by other rendered elements (e.g., a billboard display is partially obscured by a tree), etc. Furthermore, because the rendering system also plays sounds in the 3D virtual environment, processing logic is able to record when the audio advertisement components are played, what other sounds are played at the same time, etc.

Processing logic transmits data that indicates the interaction to an advertisement server (processing block 604). In one embodiment, the tracking data is transmitted directly to an advertisement server. In another embodiment, the data is routed to the advertisement server via an online gaming service.

Figure 7:
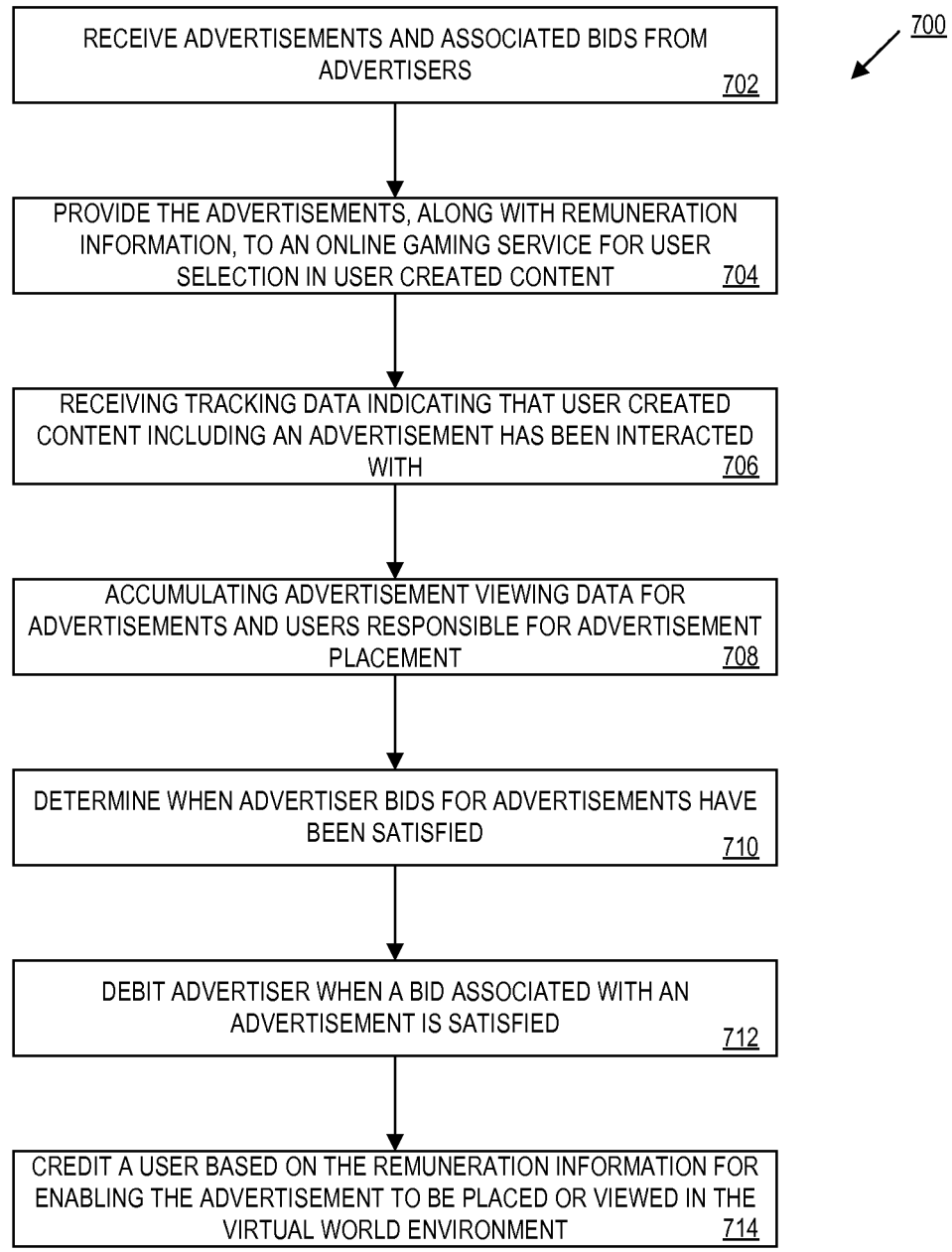
FIG. 7 is a flow diagram of one embodiment of a method for an accounting server managing advertisements for a 3D virtual world environment.

FIG. 7 is a flow diagram of one embodiment of a process 700 for an accounting server managing advertisements for a 3D virtual world environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in the advertisement server 400 of FIG. 4.

Referring to FIG. 7, process 700 begins with processing logic receiving advertisement content and associated bids from advertisers (processing block 702). As discussed above, advertisements in the form of text, audio, video, 3D models, images etc. may be received from advertisers, for placement in a virtual world environment. Furthermore, data specifying what advertisers are willing to pay for user interactions with the advertisement material is also received. In one embodiment, this is referred to as a bid, where the bid may specify one or more of caps on amount an advertiser is willing to pay, how frequently an advertisement is dynamically provisioned, what type of interactions an advertiser will pay for (i.e., only pay for clicks, or pay for accumulated viewing time greater that time T).

Processing logic provides the advertisements, along with remuneration information, to an online gaming service for user selection in user created content (processing block 704). In one embodiment, the advertisements are provided to users who are editing user-created content for a virtual world environment. Thus, the advertisements may be placed on user created clothing, user-created models, models created by other users, inserting a billboard into a virtual place, creating a themed place, etc. The remuneration information will then indicate to a user how much they will receive when advertisements on their content is viewed or otherwise interacted with by other users of the virtual world environment. In one embodiment, user remuneration is in the form of virtual currency for use in the virtual world environment. Furthermore, user remuneration in the form of virtual currency may be provided for a meta-game between users. In another embodiment, users receive cash remunerations for successful placement of advertisements. In one embodiment, the remuneration information is translated from an advertiser's bid.

The remuneration information serves as a motivator to encourage users to include advertisements in user-created content. Furthermore, by knowing the remuneration information prior to advertisement placement, users can choose which advertisements to show, know in advance how much virtual or actual currency they may make, etc.

Furthermore, when user remuneration is part of a meta-game between users (e.g., what user's can collect the most virtual cash), users are further motivated to place advertisements, build models with advertisement content, etc. In one embodiment, virtual cash may be redeemed for virtual items, as an entry fee to play virtual games, or to purchase items at an website.

Processing logic receives tracking data indicating that user-created content including an advertisement has been interacted with (processing block 706), and accumulates advertisement interaction data for advertisements and users responsible for advertisement placement (processing block 708).

Processing logic determines when advertiser bids for advertisements have been satisfied (processing block 710). In one embodiment, the accumulated viewing data is utilized by processing logic to determine when an advertiser's bid has been satisfied. For example, the accumulated viewing data may indicate that an advertisement has been clicked on 100 times, an advertisement placed on a 3D model has been viewed for 30 minutes, a threshold pixel time for an advertisement has been reached, etc.

Processing logic debits an advertiser when a bid associated with an advertisement is satisfied (processing block 712). In one embodiment, advertisers are debited in real money.

Processing logic credits a user based on the remuneration information for enabling the advertisement to be placed or viewed in the virtual world environment (processing block 714). In one embodiment, users are paid in virtual currency after processing logic receives payment from an advertiser.

In one embodiment, where an advertisement is added to content created by another user (e.g., an advertisement placed on a 3D model created by another user), both users split a virtual currency reward.

Figure 8A:
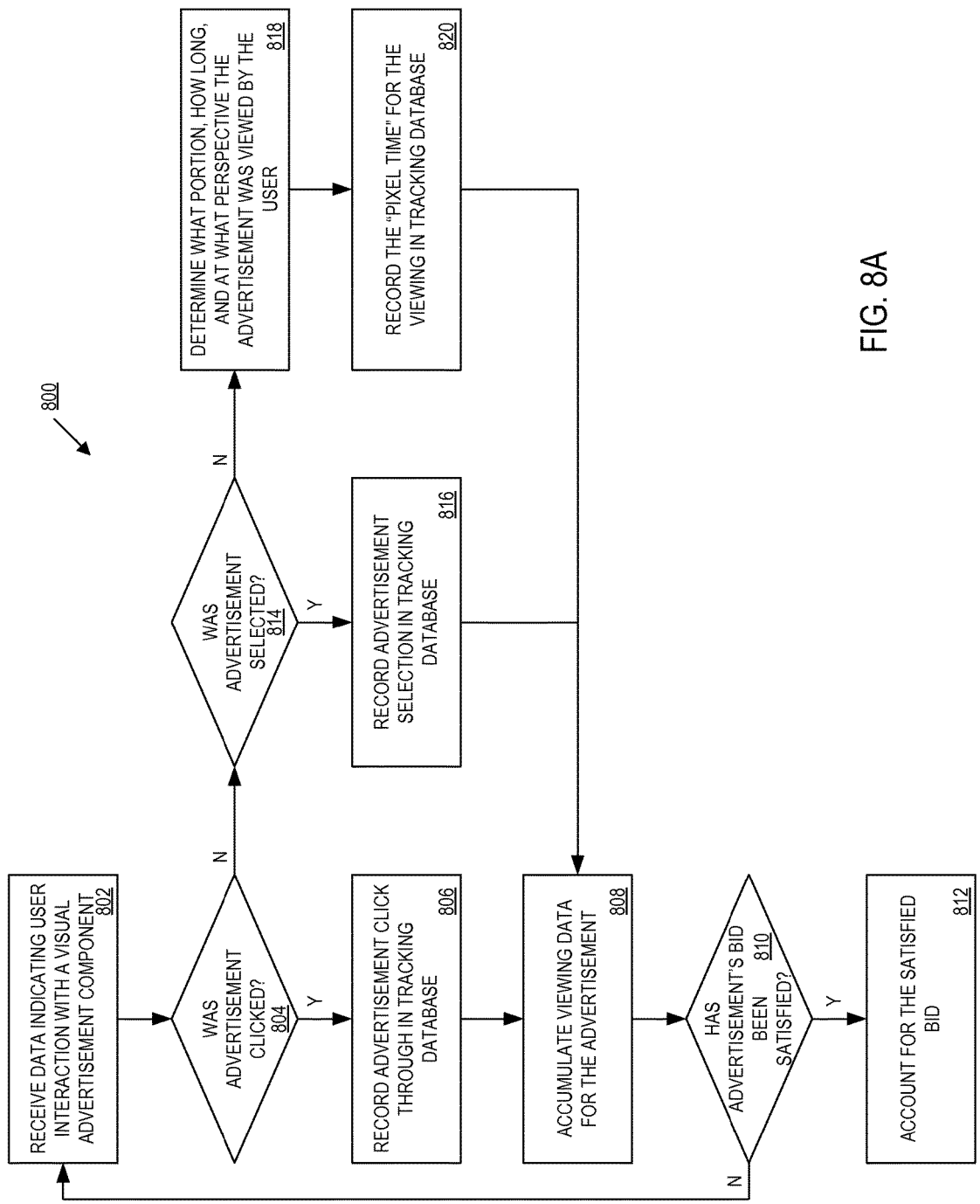
FIG. 8A is a flow diagram of one embodiment of a method for accounting for visual advertisements in a 3D virtual world environment.

FIG. 8A is a flow diagram of one embodiment of a process 800 for accounting for visual advertisements in a 3D virtual world environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in the advertisement server 400 of FIG. 4.

Referring to FIG. 8, process 800 begins with processing logic receiving data indicating a user is interacting with a visual advertisement component (processing block 802).

Processing logic determines whether the advertisement has been clicked (processing block 804). When the advertisement has been clicked, processing logic records the advertisement click in a tracking database (processing block 806).

When an advertisement has not been clicked, processing logic determines whether the advertisement was selected (processing block 814). When the advertisement is selected, processing logic records advertisement selection in the tracking database (processing block 816).

When an advertisement has not been selected, processing logic determines what portion, how long, and at what perspective the advertisement was viewed by the user (processing block 818). The pixel time for the viewing is recorded in the tracking database (processing block 820). Recording a pixel time enables processing logic to factor in conditions unique to viewing advertisements in a 3D virtual environment where advertisements may be partially obstructed, a user is able to view the advertisement from a great distance, a user is at an angle making the advertisement hard to view, etc.

Processing logic accumulates viewing data for the advertisement (processing block 808).

A determination of whether a bid for an advertisement has been satisfied is made (processing block 810). When the bid is not satisfied, based on the accumulated tracking data, processing logic returns to processing block 802 to receive additional data indicating user interaction with a visual advertisement.

When the bid is satisfied, processing logic accounts for the satisfied bid (processing block 812). As discussed above, processing logic accounts for advertisements by debiting advertisers, and crediting users responsible for placing an advertisement in a virtual world environment.

Figure 8B:
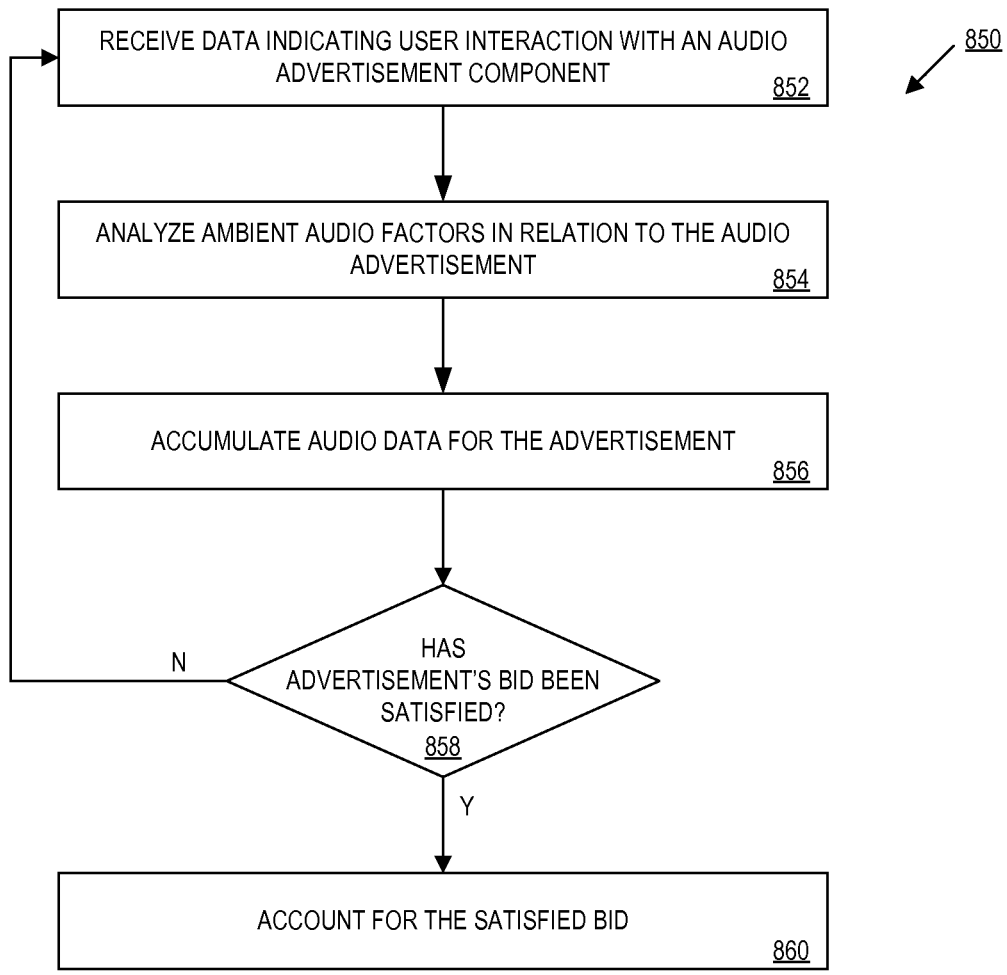
FIG. 8B is a flow diagram of one embodiment of a method for accounting for audio advertisements in a 3D virtual world environment.

FIG. 8B is a flow diagram of one embodiment of a process 850 for accounting for audio advertisements in a 3D virtual world environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in the advertisement server 400 of FIG. 4.

Referring to FIG. 8B, process 850 begins with processing logic receiving data indicating a user is interacting with an audio advertisement component (processing block 852). In one embodiment, the advertisement may be an audio clip (e.g., a song playing on a virtual radio, background music for a game, etc.). In another embodiment, the audio component of an advertisement may be audio that accompanies a video clip. For example, a video advertisement for COKE™ may be displayed in a virtual environment, along with a jingle. In one embodiment, data is tracked for both the jingle (e.g., the audio component of an advertisement) and the video (e.g., the video component of the advertisement).

Processing logic analyzes one or more ambient audio factors in relation to the audio advertisement component (processing block 854). Because the advertisements are placed in a virtual environment, various games, machines, users, etc. may be making noise within the virtual environment. In one embodiment, processing logic factors in the ambient noise in relation to the audio advertisement component to determine how much, or how well, the advertisement is heard. For example, the COKE™ video and jingle discussed above may be played in a virtual theme park. If noise from a roller coaster renders part of the jingle inaudible, processing logic factors this in prior to storage of tracking data.

Processing logic accumulates audio data for the advertisement (processing logic 856). A determination is made whether the advertisements bid has been satisfied (processing block 858). When the bid is not satisfied, processing logic returns to processing block 852 to receive additional data indicating user interaction. When the bid is satisfied, processing logic accounts for the satisfied bid (processing block 860).

Figure 9:
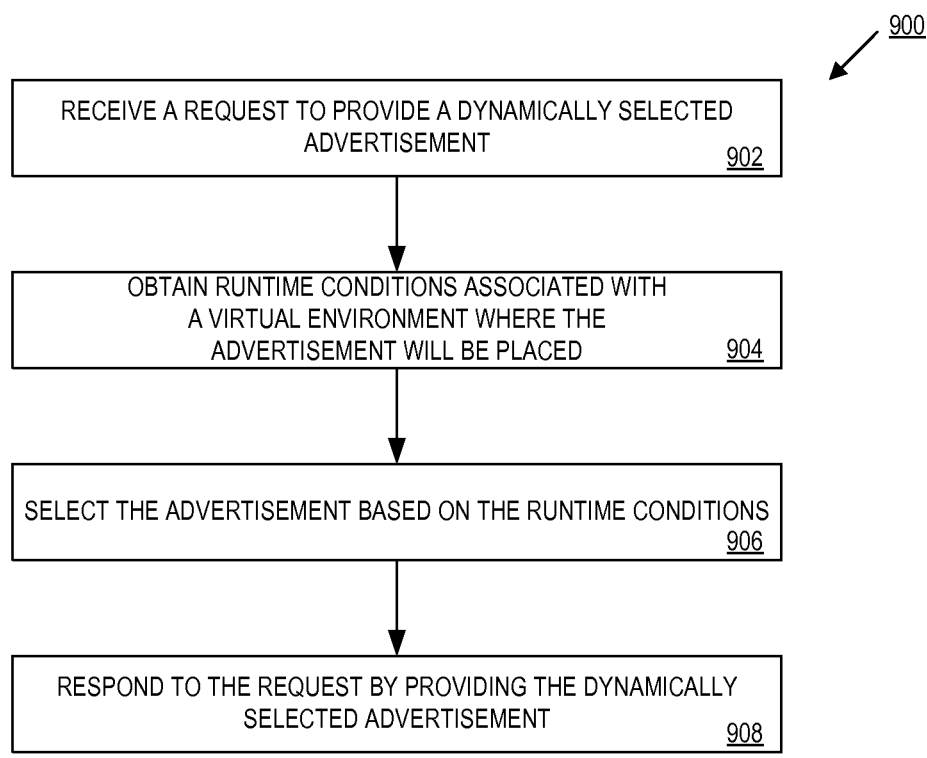
FIG. 9 is a flow diagram of one embodiment of a method for dynamic advertisement placement in a 3D virtual world environment.

FIG. 9 is a flow diagram of one embodiment of a process 900 for dynamic advertisement placement in a 3D virtual world environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in the advertisement server 400 of FIG. 4.

Referring to FIG. 9, process 900 begins with processing logic receiving a request to provide a dynamically selected advertisement (processing block 902). Processing logic obtains runtime conditions associated with a virtual world environment where the advertisement will be placed (processing block 904). In one embodiment, runtime conditions are obtained from an online gaming service, such as online gaming service 106.

An advertisement is selected based on the runtime conditions (processing block 906). In one embodiment, as discussed above, users may specify that user-created content contains a location for an advertisement, genre, targeted users, etc., but not necessarily specify a particular advertisement. Then, based on runtime conditions, such as who is viewing an advertisement, the context surrounding an advertisement, time of day, time of year, pricing information associated with an advertisement, etc., the advertisement is selected. For example, processing logic may select different advertisement for a billboard during Christmas versus Halloween. As another example, processing logic may select different advertisements for a virtual place designed for young adults versus children.

Processing logic responds to the request by providing the dynamically selected advertisement (processing block 908). In one embodiment, the dynamically selected advertisement is provided to online gaming service for display in user systems, on three dimensional models, etc.

Figure 10:
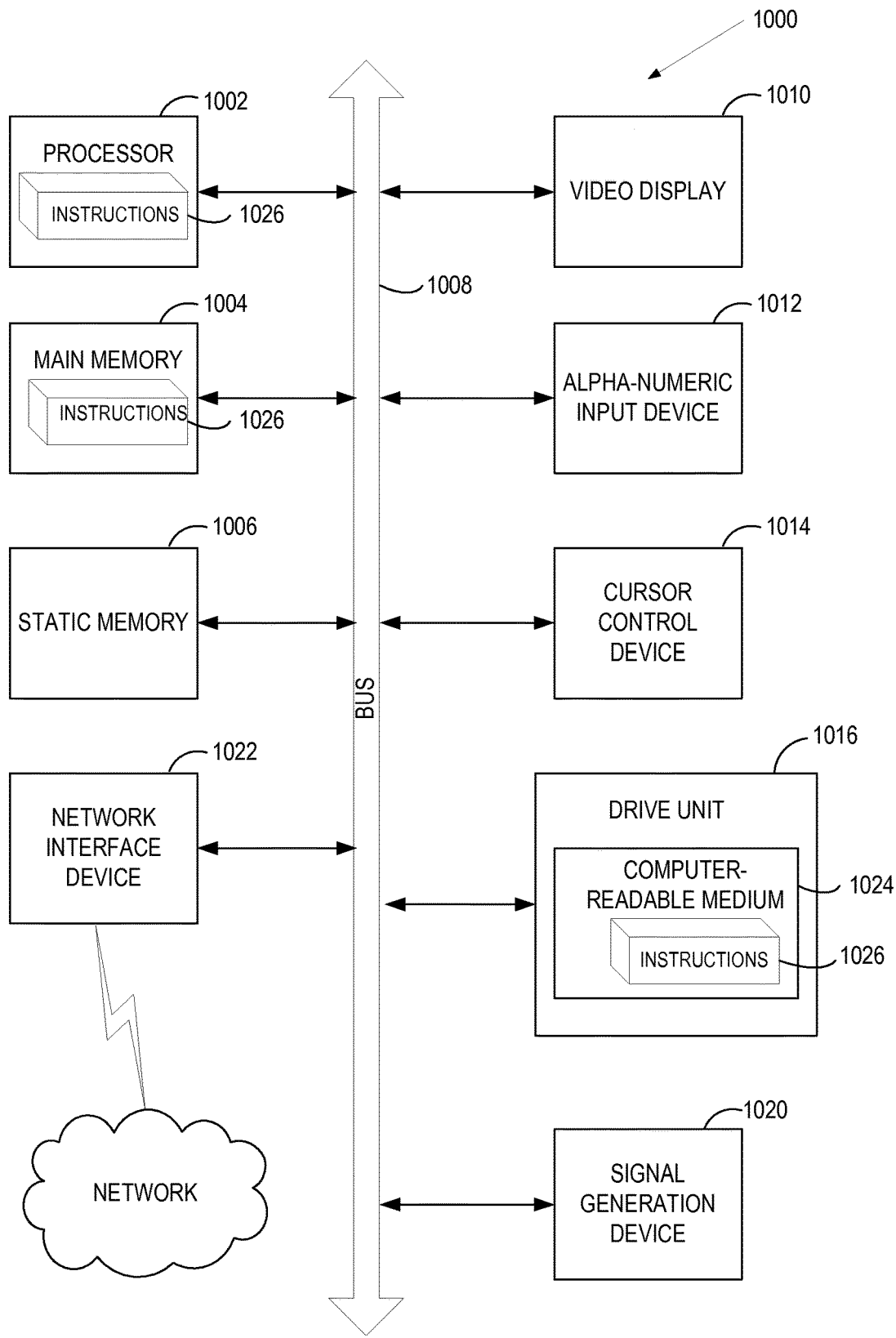
FIG. 10 is a block diagram of one embodiment of a computer system.

FIG. 10 shows a diagrammatic representation of machine in the exemplary form of a computer system 1000 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g. a keyboard), a cursor control device 1014 (e.g. a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to include, but not be limited to, solid-state memories, and optical and magnetic disks.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving, by a processor, sponsored content for placement within a virtual game of a three-dimensional (3D) virtual world environment;
   receiving, by the processor, bid data associated with the sponsored content that indicates conditions of user interaction with the sponsored content in the virtual game of the 3D virtual world environment with respect to a bid for the sponsored content, wherein the conditions of user interaction of the bid data identify a measure of viewing the sponsored content by a first user that satisfies the bid;
   providing, by the processor, the sponsored content for display within the virtual game of the 3D virtual world environment;
   receiving an indication of a user interaction with the sponsored content within the virtual game of the 3D virtual world environment;
   determining, based on the indication of the user interaction, whether the first user selected the sponsored content;
   responsive to determining that the first user did not select the sponsored content, recording presentation data indicative of the user interaction, the recording comprising:
      recording an amount of time a presentation of the sponsored content is provided for viewing to the first user,
      recording an amount of screen space occupied by the sponsored content,
      recording an indication of elements in the virtual game that partially obstruct the presentation of the sponsored content, and
      recording an angle relative to normal the presentation of the sponsored content;
   determining whether the user interaction with sponsored content fulfills the conditions of user interaction with the sponsored content identified by the bid data, wherein the conditions of user interaction comprise a threshold of pixel time for the sponsored content, wherein the pixel time is indicative of the amount of screen space occupied by the sponsored content in the virtual game of the 3D virtual world environment while accounting for the elements in the virtual game that partially obstruct the first user from viewing the sponsored content, the amount of time the presentation of the sponsored content is provided for viewing to the first user, and the angle relative to normal the presentation of the sponsored content; and
   responsive to determining that the user interaction with the sponsored content fulfills the conditions of user interaction with the sponsored content specified by the bid data, determining, by the processor, that the bid for the sponsored content is satisfied.

2. The method of claim 1, wherein receiving the sponsored content for placement within the virtual game of the 3D virtual world environment further comprises:
   receiving a user selection of the sponsored content for placement within the virtual game of the 3D virtual world environment, wherein the user selection is from a another user of the 3D virtual world environment.

3. The method of claim 2, wherein the sponsored content is associated with another virtual game of the 3D virtual world environment, the method further comprising:
   responsive to determining that the first user selected the sponsored content, transporting a character associated with the first user to the another virtual game associated with the sponsored content.

4. The method of claim 2, wherein the sponsored content is placed on a user-created content created by an other user of the virtual game of the 3D virtual world environment, the method further comprising:
   associating the user-created content with the sponsored content using a pointer; and
   wherein providing the sponsored content for display within the virtual game of the 3D virtual world environment further comprises:
   providing the sponsored content on the user-created content at runtime within the virtual game of the 3D virtual world environment based on the pointer associated with the user-created content.

5. The method of claim 4, wherein the sponsored content placed on the user-created content is displayed in the virtual game of the 3D virtual world environment as at least one of sponsored content placed on models for use by the first user, sponsored content placed on models for use by other users, sponsored content placed on models inserted into the 3D virtual world environment, or virtual clothing worn in the 3D virtual world environment.

6. The method of claim 1, further comprising:
   billing a sponsored content provider corresponding to the sponsored content in response to determining the bid has been satisfied; and crediting a virtual bank account associated with another user with virtual currency, wherein the another user selected the sponsored content for placement in the virtual game.

7. The method of claim 6, wherein the virtual currency is for use within the 3D virtual world environment.

8. The method of claim 7, wherein the virtual currency is redeemable for actual currency.

9. The method of claim 1, wherein providing the sponsored content for display within the virtual game of the 3D virtual world environment, further comprises:
determining one or more contextual factors associated with the virtual game of the 3D virtual world environment at runtime; and
comparing the one or more contextual factors with contextual criteria associated with the sponsored content, wherein the sponsored content is provided for display within the virtual game of the 3D virtual world environment responsive to determining that the one or more contextual factors satisfy the contextual criteria associated with the sponsored content.

10. The method of claim 1, wherein the pixel time is further indicative of a distance at which the sponsored content is viewed by the first user.

11. The method of claim 1, wherein the sponsored content comprises a plurality of sponsored content from a single sponsored content provider to enable the user created content to be a virtual place within the virtual game of the 3D virtual world environment based on the plurality of sponsored content from the single sponsored content provider.

12. The method of claim 1, wherein the sponsored content is at least one of a text sponsored content, an image sponsored content, a video sponsored content, an audio sponsored content, a three dimensional model that includes the sponsored content, a window sponsored content, a door sponsored content, an immersive sponsored content, an impact sponsored content, or a contextually sensitive sponsored content.

13. The method of claim 1, wherein the conditions of user interaction further comprises the first user listening to the sponsored content.

14. The method of claim 1, further comprising:
receiving a user selection of the sponsored content by the first user within the virtual game of the 3D virtual world environment; and
providing a response that comprises information about a sponsored content provider associated with the received user selection.

15. The method of claim 1, wherein the 3D virtual world environment is a three-dimensional online multiplayer gaming environment.

16. A server comprising:
a memory; and
a processor, coupled to the memory, the processor to:
receive sponsored content from a sponsored content provider for placement within a virtual game of a three-dimensional (3D) virtual world environment;
receive bid data associated with the sponsored content that indicates conditions of user interaction with the sponsored content in the virtual game of the 3D virtual world environment with respect to a bid for the sponsored content, wherein the conditions of user interaction of the bid data identify a measure of viewing the sponsored content by a first user that satisfies the bid;
provide the sponsored content to be displayed within the virtual game of the 3D virtual world environment distributed to a plurality of user computer systems;
receive an indication of a user interaction with the sponsored content within the virtual game of the 3D virtual world environment;
determine, based on the indication of the user interaction, whether the first user selected the sponsored content;
responsive to determining that the first user did not select the sponsored content, record presentation data indicative of the user interaction, the recording comprising:
record an amount of time a presentation of the sponsored content is provided for viewing to the first user,
record an amount of screen space occupied by the sponsored content,
record an indication of elements in the virtual game that partially obstruct the presentation of the sponsored content, and
record an angle relative to normal the presentation of the sponsored content;
determine whether the user interaction with sponsored content fulfills the conditions of user interaction with the sponsored content identified by the bid data, wherein the conditions of user interaction comprise a threshold of pixel time for the sponsored content, wherein the pixel time is indicative of the amount of screen space occupied by the sponsored content in the virtual game of the 3D virtual world environment while accounting for the elements in the virtual game that partially obstruct the first user from viewing the sponsored content, the amount of time the presentation of the sponsored content is provided for viewing to the first user, and the angle relative to normal the presentation of the sponsored content; and
responsive to determining that the user interaction with the sponsored content fulfills the conditions of user interaction with the sponsored content specified by the bid data, determine that the bid for the sponsored content is satisfied.

17. The server of claim 16, the processor further to:
debit a sponsored content provider responsive to determining that the bid for the sponsored content is satisfied; and
credit a virtual bank account of another user that placed the sponsored content in the 3D virtual world environment.

18. The server of claim 16, wherein to provide the sponsored content for display within the virtual game of the 3D virtual environment, the processor to:
determine one or more contextual factors associated with the virtual game of the 3D virtual world environment at runtime; and
compare the one or more contextual factors with contextual criteria associated with the sponsored content, wherein the sponsored content is provided for display within the virtual game of the 3D virtual world environment responsive to determining that the one or more contextual factors satisfy the contextual criteria associated with the sponsored content.

19. The server of claim 16, wherein the sponsored content comprises at least one of a text sponsored content, an image sponsored content, a video sponsored content, an audio sponsored content, a three dimensional model that includes the sponsored content, a window sponsored content, a door sponsored content, an immersive sponsored content, an impact sponsored content, or a contextually sensitive sponsored content.

20. A non-transitory computer readable medium comprising instructions stored thereon, that responsive to execution by a processor, cause the processor to perform operations comprising:

receiving, by the processor, sponsored content for placement within a virtual game of a three-dimensional (3D) virtual world environment;

receiving, by the processor, bid data associated with the sponsored content that indicates conditions of user interaction with the sponsored content in the virtual game of the 3D virtual world environment with respect to a bid for the sponsored content, wherein the condition of user interaction of the bid data identify a measure of viewing the sponsored content by a first user that satisfies the bid;

providing, by the processor, the sponsored content for display within the virtual game of the 3D virtual world environment;

receiving an indication of a user interaction with the sponsored content within the virtual game of the 3D virtual world environment;

determining, based on the indication of the user interaction, whether the first user selected the sponsored content;

responsive to determining that the first user did not select the sponsored content, recording presentation data indicative of the user interaction, the recording comprising:

recording an amount of time a presentation of the sponsored content is provided for viewing to the first user, recording an amount of screen space occupied by the sponsored content, recording an indication of elements in the virtual game that partially obstruct the presentation of the sponsored content, and recording an angle relative to normal the presentation of the sponsored content;

determining whether the user interaction with sponsored content fulfills the conditions of user interaction with the sponsored content identified by the bid data, wherein the conditions of user interaction comprise a threshold of pixel time for the sponsored content, wherein the pixel time is indicative of the amount of screen space occupied by the sponsored content in the virtual game of the 3D virtual world environment while accounting for the elements in the virtual game that partially obstruct the first user from viewing the sponsored content, the amount of time the presentation of the sponsored content is provided for viewing to the first user, and the angle relative to normal the presentation of the sponsored content; and responsive to determining that the user interaction with the sponsored content fulfills the conditions of user interaction with the sponsored content specified by the bid data, determining, by the processor, that the bid for the sponsored content is satisfied.

21. The non-transitory computer readable medium of claim 20, wherein receiving the sponsored content for placement within the virtual game of the 3D virtual world environment, the operations further comprising:

receiving a user selection of the sponsored content for placement within the virtual game of the 3D virtual world environment, wherein the user selection is from another user of the 3D virtual world environment.

22. The non-transitory computer readable medium of claim 21, wherein the sponsored content is associated with another virtual game of the 3D virtual world environment, the operations further comprising:

responsive to determining that the first user selected the sponsored content, transporting a character associated with the first user to the another virtual game associated with the sponsored content.

23. The non-transitory computer readable medium of claim 21, wherein the sponsored content is placed on a user-created content created by an other user of the virtual game of the 3D virtual world environment, the operations further comprising:

associating the user-created content with the sponsored content using a pointer; and wherein providing the sponsored content for display within the virtual game of the 3D virtual world environment further comprises:

providing the sponsored content on the user-created content at runtime within the virtual game of the 3D virtual world environment based on the pointer associated with the user-created content.

24. The non-transitory computer readable medium of claim 20, the operations further comprising:

billing a sponsored content provider corresponding to the sponsored content in response to determining the bid has been satisfied; and crediting a virtual bank account associated with another user with virtual currency, wherein the another user selected the sponsored content for placement in the virtual game.

25. The non-transitory computer readable medium of claim 20, wherein providing the sponsored content for display within the virtual game of the 3D virtual world environment, the operations further comprising:

determining one or more contextual factors associated with the virtual game of the 3D virtual world environment at runtime; and comparing the one or more contextual factors with contextual criteria associated with the sponsored content, wherein the sponsored content is provided for display within the virtual game of the 3D virtual world environment responsive to determining that the one or more contextual factors satisfy the contextual criteria associated with the sponsored content.

26. The non-transitory computer readable medium of claim 20, wherein the pixel time is further indicative of a distance at which the sponsored content is viewed by the first user.

* * * * *